United States Patent [19]
Van Allman

[11] Patent Number: 5,292,216
[45] Date of Patent: Mar. 8, 1994

[54] FASTENER ASSEMBLY FOR A POWER ACTUATED TOOL

[75] Inventor: Don T. Van Allman, Palatine, Ill.

[73] Assignee: Illinois Tool Works Inc., Glenview, Ill.

[21] Appl. No.: 31,205

[22] Filed: Mar. 12, 1993

[51] Int. Cl.$^5$ .................. F16B 15/00; F16B 15/02
[52] U.S. Cl. .................. 411/441; 411/480; 411/485
[58] Field of Search .............. 411/440, 441, 469, 480, 411/485, 923; 248/547

[56] References Cited

U.S. PATENT DOCUMENTS

| | | | |
|---|---|---|---|
| 2,961,210 | 11/1960 | Pfaff et al. | 248/74 |
| 3,137,195 | 6/1964 | Rosenberg, Jr. | 411/441 |
| 3,377,903 | 4/1968 | Korte | 411/441 |
| 3,382,751 | 5/1968 | Kopf . | |
| 3,452,637 | 7/1969 | O'Brien . | |
| 3,516,323 | 6/1970 | O'Brien | 411/441 |
| 3,638,892 | 2/1972 | Boye et al. | 248/300 |
| 4,684,050 | 8/1987 | Masas | 227/10 |
| 4,703,883 | 11/1987 | Losada | 227/9 |
| 4,736,923 | 4/1988 | Losada | 248/547 |
| 5,110,247 | 5/1992 | Losada | 411/441 |

Primary Examiner—Neill R. Wilson
Attorney, Agent, or Firm—Schwartz & Weinrieb

[57] ABSTRACT

A fastener assembly including an elongate annular drive pin having a head on one end and being tapered substantially to a point on an opposite end and a clip member having first and second opposite sides, the first side capable of engaging a desired surface into which the drive pin is driven and the second opposite side including a tubular chimney portion extending therefrom a predetermined distance and formed as a continuous substantially annular member having a central bore extending through the chimney portion and the clip member, the bore having a non-annular cross-sectional configuration on at least a longitudinal portion thereof to provide discontinuous contact about the annular periphery of the drive pin enabling the drive pin to be press fitted within the longitudinal portion of the bore to releasably retain the drive pin to the clip member prior to use and further enabling the chimney portion to positively guide and align the drive pin as it is driven while simultaneously providing controlled outward curling of a distal end of the chimney portion upon driving the drive pin through the bore.

14 Claims, 1 Drawing Sheet

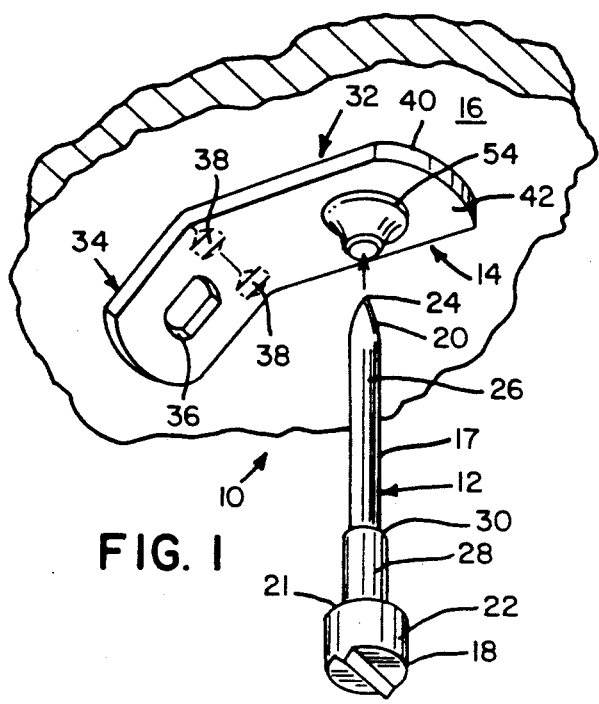
FIG. 1
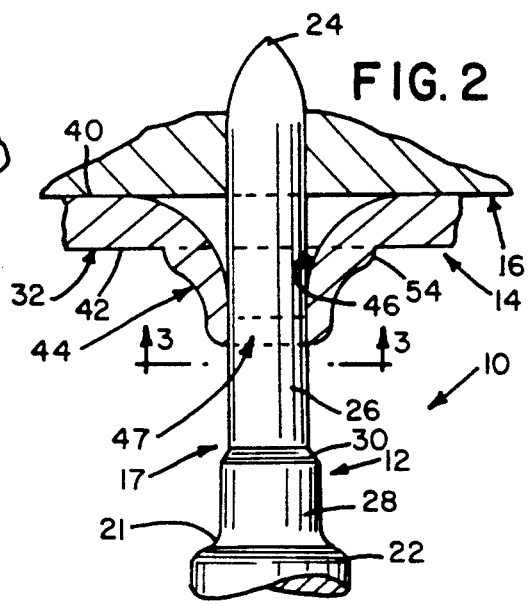
FIG. 2
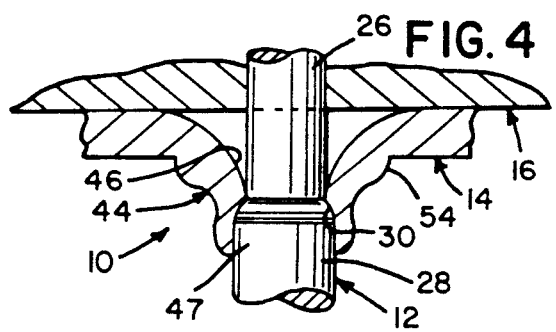
FIG. 4
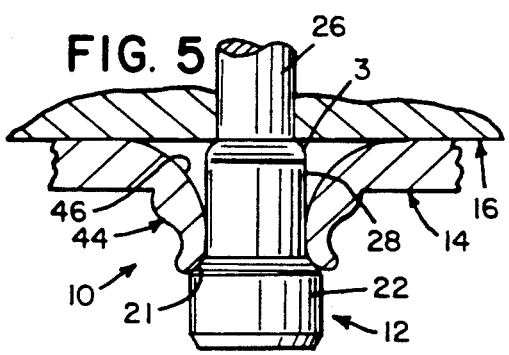
FIG. 5
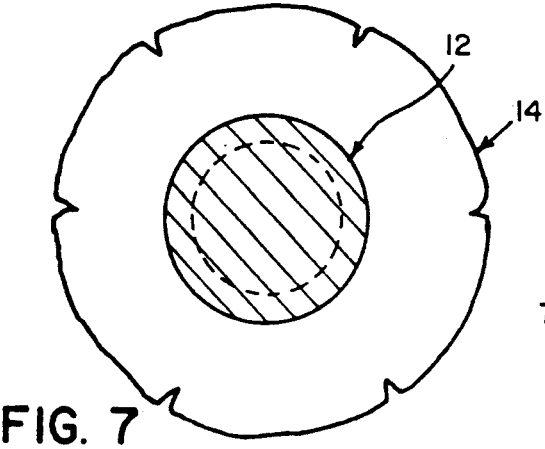
FIG. 3
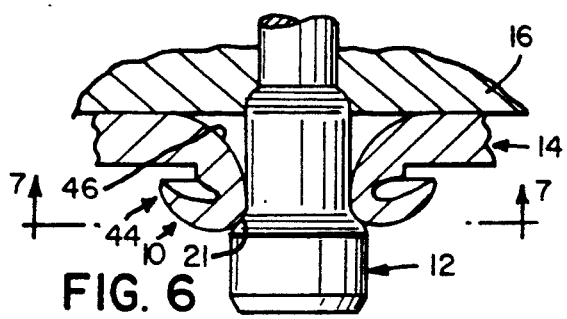
FIG. 7
FIG. 6

FASTENER ASSEMBLY FOR A POWER ACTUATED TOOL

BACKGROUND OF THE INVENTION

1. Field of the Invention

This invention relates generally to a fastener assembly for use with a power actuated tool which preferably is driven by an explosive charge. The assembly includes a drive pin and a clip member for attaching other articles thereto where the clip provides positive alignment and location of the drive pin with respect to a surface into which the drive pin is driven and provides controlled deformation of the clip during fastening that prevents the clip from failing or being separated from the drive pin when a load is applied to the assembly.

2. Description of the Related Art

Power actuated tools typically drive a fastener into a relatively solid surface, such as structural steel, concrete and the like, by means of some type of explosive powder charge. The fasteners frequently are utilized with various forms of clips from which other articles can be suspended, such as pipes, conduits, ceiling panels or the like.

Such fasteners typically are inserted through an aperture in the clip and are driven into the desired surface by the explosive force provided by the powder charge. During such fastening, the clip frequently is deformed by the fastener which detracts from the strength of the clip causing its premature failure, usually with the fastener remaining attached to the surface.

To restrict clip deformation, the clip can be reinforced about the aperture through which the fastener is driven. An example of such a fastener is illustrated in U.S. Pat. No. 2,961,210 which discloses a fastening assembly including a clip and an annular fastener where the fastener is initially press fitted within an annular hole formed in an annular boss of the clip. As the fastener is driven through the boss, the boss is compressed by the head of the fastener to approximately half its original height and is jammed about the shank of the fastener in an uncontrolled manner. If desired, the side wall of the boss can include slots positioned at selected areas about its periphery to provide one or more pairs of opposing, resilient attaching fingers.

Such a fastener, however, relies on the fastener head and resilience of the material forming the boss to randomly compress the boss without any substantial outward bending or curling of the boss. This type of pure compression causes uncontrolled stress within the clip as well as uncontrolled and unpredictable compression of the boss, either of which can prevent proper fastening and cause failure of the clip when it is subjected to a load. If the boss includes attaching fingers they significantly reduce the ability of the boss to positively guide the fastener in a straight line. If the fastener is tilted or skewed with respect to the surface into which it is being driven it tends to glance off the surface providing a potentially dangerous condition to a user.

It therefore would be desirable to provide a fastener assembly, preferably for use with a power actuated tool, where a drive pin of the fastener is driven through and deforms a clip in a controlled predictable and reproducible manner where the clip provides positive alignment of the drive pin while it is being driven and prevents undesired stress within the clip which could lead to failure and separation of the clip from the drive pin when subjected to a load.

SUMMARY OF THE INVENTION

The invention provides a fastener assembly having an elongate drive pin and a clip member. The drive pin includes an annular shank having first and second opposite ends where the first end of the shank includes a head and the second opposite end of the shank is tapered substantially to a point. The clip member includes first and second opposite sides where the first side is capable of engaging a desired surface into which the drive pin is driven and the second opposite side includes a tubular chimney portion extending therefrom a predetermined distance. The chimney portion is formed as a continuous substantially annular member having a central bore extending through the chimney portion and the clip member. The bore includes a non-annular cross-sectional configuration on at least a longitudinal portion thereof to provide discontinuous contact about the annular periphery of the drive pin. The discontinuous contact enables the drive pin to be press fitted within the longitudinal portion of the bore to releasably retain the drive pin to the clip member prior to use and further enables the chimney portion to positively guide and align the drive pin as it is driven while simultaneously providing controlled outward curling of a distal end of the chimney portion upon driving the drive pin through the bore.

BRIEF DESCRIPTION OF THE DRAWINGS

Various objects, features, and attendant advantages of the present invention will become more fully appreciated from the following detailed description, when considered in connection with the accompanying drawings, in which like reference characters designate like or corresponding parts throughout the several views, and wherein:

FIG. 1 is a perspective exploded view of the fastener assembly of the invention illustrated in conjunction with a surface into which the fastener is to be driven;

FIG. 2 is an enlarged side elevational view of the fastener assembly of the invention with the drive pin engaged within the clip, which is illustrated in cross-section, and initially being driven into the surface;

FIG. 3 is a partial cross-sectional view of the fastener assembly of the invention taken along lines 3—3 of FIG. 2 and in the direction indicated by the arrows;

FIG. 4 is an enlarged side elevational view of the fastener assembly of the invention, similar to FIG. 2, illustrating a first intermediate driving position of the drive pin;

FIG. 5 is an enlarged side elevational view of the fastener assembly of the invention, similar to FIG. 4, illustrating a second intermediate driving position of the drive pin;

FIG. 6 is an enlarged side elevational view of the fastener assembly of the invention, similar to FIG. 5, illustrating a final driven position of the drive pin; and FIG. 7 is a partial cross-sectional view of the fastener head and the clip of the invention taken along lines 7—7 of FIG. 6 and in the direction indicated by the arrows.

DESCRIPTION OF THE PREFERRED EMBODIMENT

Referring to FIG. 1, the fastener assembly of the invention is designated generally by the reference numeral 10. The assembly 10 includes an elongate drive pin 12 and a clip member 14 and the drive pin 12 is preferably driven into and retained against a surface 16, such as concrete, brick or the like.

Preferably, the assembly 10 is pre-assembled and utilized with a power actuated tool which utilizes an explosive charge (not illustrated) but the particular mechanism or method of attaching the assembly 10 to the surface 16 can vary. Additionally, both the drive pin 12 and the clip 14 are preferably made of metal having a predetermined hardness depending upon the desired application, but the particular material can vary.

The drive pin 12 includes a shank 17 having first and second opposite ends 18 and 20. The first end 18 is formed with a head portion 22 having a predetermined thickness and diameter and being slightly tapered on an underside 21. To assist in driving the drive pin 12 into the surface 16, the second end 20 preferably is tapered substantially to a point 24.

The shank 17 includes a first longitudinal portion 26 having a first predetermined diameter and a second longitudinal portion 28 having a second predetermined diameter which is slightly larger than the first diameter. As FIG. 2 illustrates, to provide a transition between the first and second longitudinal portions 26 and 28, a tapered shoulder 30 is included therebetween.

As FIG. 1 illustrates, the clip 14 includes a first base portion 32 and a second leg portion 34 which is provided at approximately a forty-five degree angle with respect to the base portion 32. To enable another article to be attached to the clip 14 after it is installed upon the surface 16, the leg portion 34 includes at least one aperture 36 therethrough which preferably is an elongate hole.

To reinforce the bend between the base portion 32 and the leg portion 34, reinforcing nibs 38 are provided. Preferably, two nibs 38 are included which are struck from the clip 14, but the number, position and method of providing the nibs 38 can vary.

As FIG. 2 illustrates, the base portion 32 includes a first side or surface 40 for engagement with the surface 16 and a second opposite side or surface 42. To engage the drive pin 12 before use and to guide and absorb the force of the drive pin 12 as it is being driven, the second side 42 includes a tubular chimney portion 44 upstanding therefrom.

The chimney 44 preferably is struck from the first side 40 and extends a predetermined distance away from the base portion 32. The chimney 44 includes a central bore or aperture 46 extending through both the chimney 44 and the base portion 32 which preferably flares outwardly as it extends through the base portion 32.

As FIG. 3 illustrates, in order to press-fit the drive pin 12 within the bore 46 before use, the bore 46 has a unique cross-sectional configuration at least on one longitudinal portion 47 thereof. Preferably, the bore 46 is substantially in the form of a delta or triangular configuration defined by three substantially equal sides 48 where the three corners of the triangle are cut-off to form semicircular portions 50. If the three sides 48 were extended until they intersect, they preferably would form a substantially equilateral triangle.

Accordingly, as FIGS. 2 and 3 illustrate, before use and during initial driving of the drive pin 12, the first longitudinal portion 26 of the shank 17 is selected to have a diameter for press fitting engagement within the longitudinal portion 47 of the bore 46. Specifically, the diameter of the first longitudinal portion 26 of the shank 17 is selected so that is establishes point contact in three locations about the bore 46, namely, a midpoint 52 of each of the three sides 48. The contact is sufficient to press fit or retain the shank 17 within the bore 46 until use.

This design provides a positive three point contact with the annular periphery of the drive pin 12 as opposed to contact about the entire periphery of the drive pin 12. Such a design enhances reproducibility of the engagement while maintaining a more narrow range of force required to dislocate the drive pin 12 from the bore 46 when the drive pin 12 is driven.

Additionally, due to the inherent stability of the delta or triangular configuration, positive alignment is provided when the drive pin 12 is driven. The configuration prevents the drive pin 12 from being driven skew, which can occur with fasteners having one or more pairs of opposing fingers holding the drive pin 12.

It is to be noted that the end of each side 48 provides six weakened areas or points 53 about the chimney 44. Each weakened area 53 promotes expansion and curling of the chimney 44 as described below but does not reduce the holding power or alignment capabilities of the chimney 44 with respect to the drive pin 12.

To enable holding of the assembly 10 by a power tool or the like, the chimney 44 can include a boss 54 formed about its periphery proximate the base portion 32. The boss 54 also reinforces the base of the chimney 44 to restrict curling to the distal end of the chimney 44. Alternatively, the assembly 10 can be attached to the power tool in any desired way.

In use, the drive pin 12 preferably is press fitted within the chimney 44 prior to shipping. The point 24 of the drive pin 12 can either be flush with the first side 40 of the clip 14, extend beyond the first side 40 or positioned within the chimney 44. Alternatively, the drive pin 12 can be assembled to the chimney 44 on-site.

The assembly 10 is then loaded into a power tool with the first side 40 of the clip 14 or the point 24 of the drive pin 12 positioned against the surface 16. The power tool is then activated to drive the drive pin 12 into the surface 16 as illustrated in FIGS. 2 and 4-6.

Specifically, FIG. 2 illustrates an initial driving position of the assembly 10. In this position, the point 24 begins to penetrate the surface 16 while the delta or triangular configuration of the longitudinal portion 47 of the chimney 44 positively aligns and guides the drive pin 12 along the first longitudinal portion 26 of the drive pin 12.

FIG. 4 illustrates a first intermediate driving position of the drive pin 12 where the shoulder 30 between the first and second portions 26 and 28 of the shank 17 extends within the chimney 44 and past the longitudinal portion 47. At this point initial outward bending of the chimney 44 begins as the second portion 28 of the shank 17 enters the bore 46.

FIG. 5 illustrates a second intermediate driving position of the drive pin 12 where the underside 21 of the head 20 contacts the chimney 44 and begins to uniformly curl the chimney 44 outwardly.

FIG. 6 illustrates the final driven position of the drive pin 12 with a cross-sectional view of the curled chimney 44 illustrated in FIG. 7. At this point the drive pin 12 is driven to its final position within the surface 16 and the chimney 44 is curled outward. The chimney 44 has absorbed most of the force of the drive pin 12, rather than the base portion 32. When under load, the chimney 44 will not pull over the head 20 of the drive pin 12 before the drive pin 12 pulls out of the surface 16.

It is to be noted that, about the periphery of the chimney 44, slight cracking can occur at radial positions which substantially correspond to the positions of the six weakened areas 53. Due to the six weakened areas 53, the cracking or expansion is concentrated and limited to those areas in order to provide predictable and reproducible expansion and curling of the chimney 44 without damaging the structural integrity of the clip 14.

Modifications and variations of the present invention are possible in light of the above teachings. It therefore is to be understood that within the scope of the appended claims the invention may be practiced otherwise than as specifically described.

What is claimed and desired to be secured by letters patent is:

1. A fastener assembly, comprising:
    an elongate drive pin having a cylindrical shank including first and second opposite ends, said first end of said shank including an enlarged head and said second opposite end of said shank being tapered to a point; and
    a clip member having a base which comprises first and second opposite sides, said first side being capable of engaging a surface of a substrate into which said drive pin is to be driven, and said second opposite side including a tubular chimney portion extending axially therefrom a predetermined distance and being formed as a continuous, substantially annular member having a central bore extending through said chimney portion and said base of said clip member, said bore of said chimney portion having a non-annular cross-sectional configuration along a longitudinal portion thereof so as to provide discontinuous contact about the outer periphery of said drive pin such that said drive pin is able to be press-fitted within said longitudinal portion of said bore so as to releasably retain said drive pin within said clip member prior to use and so as to further enable said chimney portion to positively guide and align said drive pin as it is driven into said substrate, said enlarged head of said drive pin shank simultaneously engaging a distal free end of said chimney portion of said clip member so as to cause controlled outward curling of said distal free end of said chimney portion of said clip member by said head of said drive pin shank upon driving of said drive pin through said bore of said chimney portion such that said clip member is secured upon said surface of said substrate as a result of said curled end of said chimney portion being interposed between said surface of said substrate and said head of said drive pin shank.

2. The assembly as set forth in claim 1, further comprising:
    boss means defined upon said clip member between said base and said chimney portion for enabling said assembly to be held by a power tool during driving of said drive pin into said substrate.

3. The assembly as set forth in claim 1, wherein:
    said enlarged head of said drive pin has a predetermined diametrical extent; and
    said cylindrical shank has first and second shank portions having first and second diametrical extents, respectively, which are less than said predetermined diametrical extent of said enlarged head of said drive pin; said first shank portion, disposed closest to said second pointed end of said shank, having the smallest diametrical extent which corresponds to said radial dimensions of said bore of said chimney portion such that said drive pin is press-fitted within said longitudinal portion of said bore of said chimney portion as a result of contact between said longitudinal portion of said bore of said chimney portion and said first shank portion; and said second shank portion, interposed between said first shank portion and said enlarged head, having a diametrical extent which is larger than said diametrical extent of said first shank portion, but less than said diametrical extent of said enlarged head, so as to radially expand said distal free end of said chimney portion of said clip member as said drive pin is being driven into said substrate.

4. The assembly as set forth in claim 3, further comprising:
    tapered shoulder portions defined between said first and second shank portions, and between said second shank portion and said enlarged head, for providing smooth transitions between said shank and head portions.

5. The assembly as set forth in claim 1, further comprising:
    a leg portion integrally fixed to said base portion of said clip member and extending at a predetermined angle with respect to said base portion of said clip member for enabling articles to be suspendingly supported by said clip member, relative to said substrate, after said clip member is secured to said substrate by said drive pin.

6. The assembly as set forth in claim 5, wherein:
    said leg portion is disposed at an angle of 45° with respect to said base portion of said clip member; and
    aperture means are defined within said leg portion for permitting said articles to be suspendingly supported by said clip member.

7. The assembly as set forth in claim 5, further comprising:
    reinforcing nibs interposed between said leg portion and said base portion of said clip member for reinforcing said relative angled disposition of said leg and base portions of said clip member.

8. The assembly as defined in claim 1, wherein:
    said discontinuous contact includes at least three points of contact defined between said outer periphery of said drive pin and said longitudinal portion of said bore of said chimney portion.

9. The assembly as set forth in claim 2, wherein:
    said three points of contact are defined by means of three planar surfaces angled with respect to each other so as to substantially define a triangular configuration.

10. The assembly as set forth in claim 7, wherein:
    said three planar surfaces have three arcuate portions interposed between successive ones of said three planar surfaces; and
    said three planar surfaces are of equal length such that if the lengths of said three planar surfaces were extended so as to intersect adjacent ones of said three planar surfaces, said three planar surfaces would define an equilateral triangle.

11. A fastener assembly for use with a power actuated tool, comprising:
    an elongate drive pin having an annular shank including first and second opposite ends, said first end of said shank including a head and said second opposite end of said shank being tapered substantially to a point, said shank including a first longitudinal portion having a first predetermined diameter and a second longitudinal portion having a second predetermined diameter, said second longitudinal portion being positioned between said head and said first longitudinal portion and having a larger diameter than said first longitudinal portion; and a clip member having first and second opposite sides, said first side capable of engaging a desired surface into which said drive pin is driven and said second opposite side including a tubular chimney portion extending therefrom a predetermined distance, said chimney portion being formed as a continuous substantially annular member having a central bore extending through said chimney portion and said clip member, said bore including a longitudinal portion thereof having a substantially delta shaped cross-sectional configuration where three corners forming the delta shape are rounded off with a predetermined radius, the size of said bore being selected so that the annular periphery of said first longitudinal shank portion makes point contact with three sides of said longitudinal portion of said bore proximate their midpoints for press fitting engagement therewith to releasably retain said drive pin within said bore prior to use, each side of said bore further providing a weakened area at each of its opposite ends spaced about said chimney portion for promoting controlled, uniform expansion and outward curling of a distal end of said chimney portion upon driving said second longitudinal portion and said head of said shank into said bore.

12. The assembly as defined in claim 3 wherein said chimney portion includes a boss formed about a proximal end thereof for engagement and holding of said clip by a power tool prior to use.

13. The assembly as defined in claim 3 wherein said clip includes a leg portion integrally formed therewith and extending at a forty-five degree angle from a plane substantially containing said clip, said leg portion including an aperture therethrough from which another article can be attached and including at least one reinforcing nib formed between the intersection of said clip and said leg portion.

14. The assembly as defined in claim 3 wherein the periphery of said distal end of said chimney portion initially is contained within the confines of the periphery of said head portion and, upon driving of said drive pin, said distal end is deformed in two stages, said first stage provided by said second longitudinal portion of said shank and including initial controlled, uniform outward expansion and curling of said distal end of said chimney with said second stage provided by said head portion including final controlled, uniform outward expansion and curling of said distal end of said chimney.

* * * * *